Patented Feb. 17, 1931

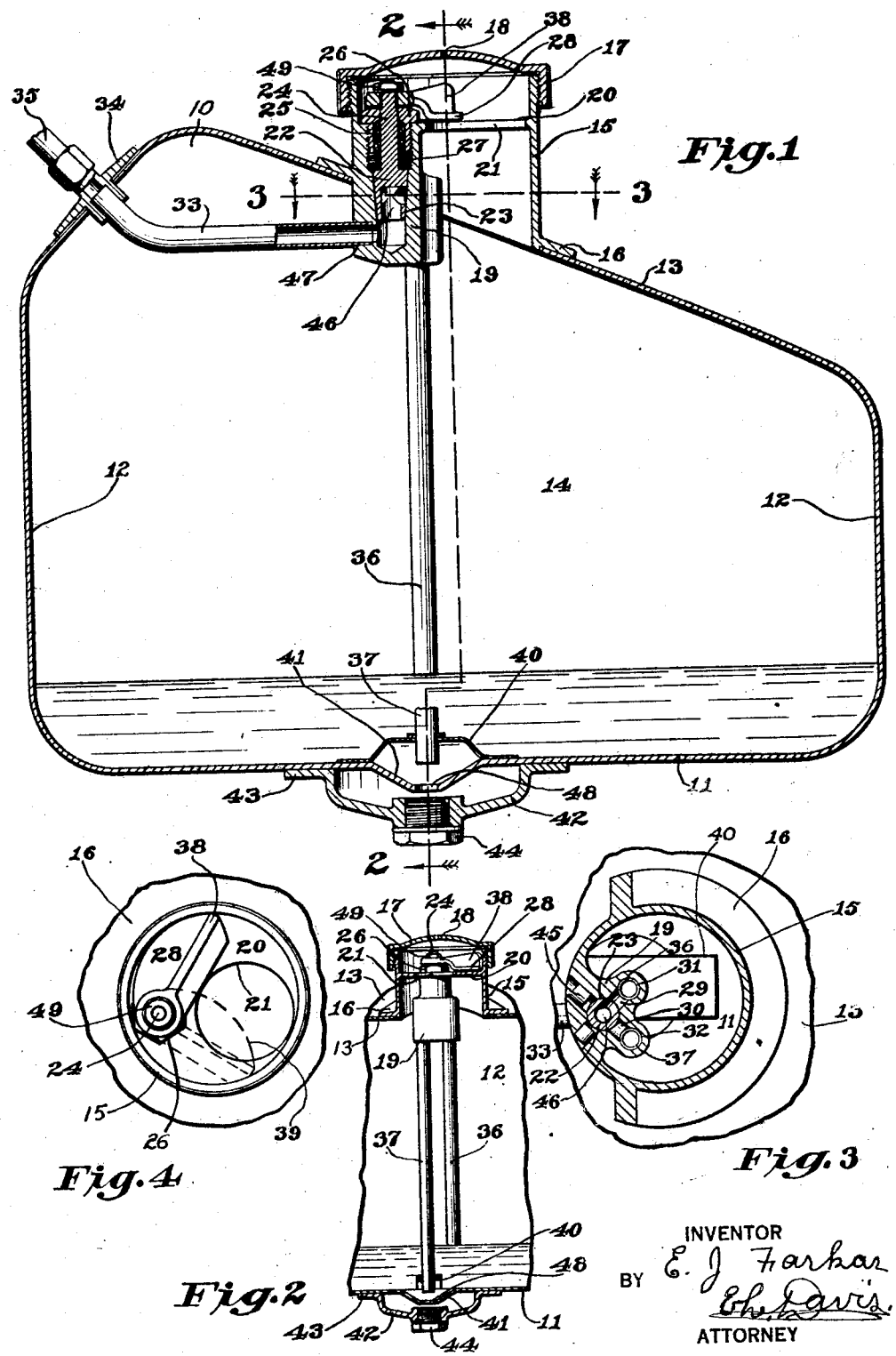

1,792,827

UNITED STATES PATENT OFFICE

EUGENE J. FARKAS, OF DETROIT, MICHIGAN, ASSIGNOR TO FORD MOTOR COMPANY, OF DEARBORN, MICHIGAN, A CORPORATION OF DELAWARE

FUEL TANK

Application filed August 21, 1929. Serial No. 387,332.

The object of my invention is to provide a fuel tank of simple, durable and inexpensive construction.

A further object of my invention is to provide a fuel tank having a two way valve therein with a tube leading from the common port of this valve to the engine compartment of the automobile. A second tube extends from one of the other ports of the valve to the bottom of the fuel tank, and a third tube extends from the other port of the valve to position spaced from the bottom of the fuel tank. A manual operating lever is provided for this valve so that the first mentioned tube may be connected with either of the latter mentioned tubes to thereby draw the fuel from the bottom of the tank or from a point spaced above the bottom of the tank.

Still a further object of my invention is to provide a fuel tank disposed at the rear of an automobile having a two way valve therein. The common port of this valve is connected to the engine carburetor and a pair of tubes extend from the other two ports of the valve to positions at the bottom of the tank and at a point near the bottom of the tank, respectively. The valve is provided with an operating lever adjacent to the tank filler neck so that when the common port of the valve is connected to the tube extending to the bottom of the tank, the manual control lever will obstruct the tank filler neck.

In the past, auxiliary tanks have been placed inside of the main fuel tank of an automobile and a two way valve has been connected to these tanks so that the operator could drain the fuel from the auxiliary tank if desirable. Generally the form of device used consisted of a false bottom placed in the tank several inches above the true bottom and the upper portion used for a main fuel tank while the lower compartment was used for an auxiliary tank.

An opening was invariably placed in the false bottom so that when the main fuel compartment was being filled the auxiliary tank would also be filled. This latter feature is necessary when the tanks are used with automobiles so that the operator cannot neglect to fill the auxiliary tank.

When this above mentioned construction is used the fuel will, of course, flow into the auxiliary tank from the main tank and it will also be drawn from the main tank through the auxiliary tank when the control valve is connected to this latter tank. Both tanks will empty when the valve is connected to the auxiliary tank.

The main objection to the aforesaid device is that the operator of the car will drive until the fuel in the main tank is exhausted, he will then operate the valve connecting the auxiliary tank with the engine and will again run the car until he reaches a fuel station, where the attendant will refill the tanks. The auxiliary tank is so seldom used that the operator generally does not think to switch the control valve back to the main tank so that the fuel may be drawn only from this main tank. The car will again be driven and the position of the fuel valve ignored. At some later time the fuel will be exhausted and then the operator, thinking that he has a reserve supply in the auxiliary tank, will attempt to switch the valve to the auxiliary tank and discover that he has drained the fuel from both the main fuel tank and the auxiliary tank. The purpose of the auxiliary tank is thereby defeated by the carelessness of the operator.

The object of the invention described in this specification is to provide means so that, regardless of the carelessness of the operator, the control valve will be returned to the position where it connects only with the main fuel tank. This is accomplished by placing the valve operating lever so that when fuel is being drawn from the auxiliary tank the valve operating lever will obstruct the fuel intake passage or filler neck. Before the operator or the fuel station attendant may fill the tank with fuel, the control valve must be returned to the position whereby it draws fuel only from the main tank.

This is a very easy device to operate because, when a car drives up to a fuel station and the attendant attempts to insert the nozzle of the fuel hose into the filler neck the control lever obstructs the fuel nozzle. The attendant then moves the lever to one side, inserts the nozzle, and then fills the tank. If the auxiliary tank has not been in use, the attendant of course does not touch the lever as the opening is already unobstructed.

Still a further object of my invention is to provide a fuel tank having a combined main and auxiliary compartment and to provide a sump on the bottom of the tank connected to this compartment so that water or dirt may flow by gravity into this sump and so that the contents of the sump will be prevented from mixing with the fuel by surging of the fuel in the tank.

With these and other objects in view my invention consists in the arrangement, combination, and construction of the various parts of my improved device as described in the specification, claimed in my claims, and illustrated in the accompanying drawings, in which:

Figure 1 shows a vertical transverse central sectional view through the fuel tank and control valve.

Figure 2 shows a vertical sectional view taken on the line 2—2 of Figure 1.

Figure 3 shows a sectional view taken on the line 3—3 of Figure 1, and

Figure 4 shows a top view of the filler neck, the cap being removed to show the valve operating lever.

Referring to the accompanying drawings, I have used the reference numeral 10 to indicate generally a fuel tank associated with an automobile. This tank has a bottom 11, sides 12, top 13, and ends 14. Any shape of tank may be used with my improved device, the above mentioned structure being shown because it is of a shape ordinarily provided on automobiles.

A filler neck 15 is secured to a suitable opening in the top 13 by means of a flange 16 which is brazed or riveted to this top. The upper end of the filler neck 15 is exteriorly threaded to co-act with corresponding threads in a cap 17 which closes the upper end of the filler neck. An air vent 18 is provided in the cap 17 to allow for air displacement as the fuel is being withdrawn from the tank.

A valve body 19 is cast integral with the filler neck 15 and extends from position inside of the tank 10 into the filler neck 15. The upper end of the valve body 19 is reinforced by a web 20 which extends radially to the walls of the filler neck 15. This body portion 19 is cast adjacent to one wall of the filler neck and the web 20 is provided with an opening 21 adjacent to the opposite wall of the filler neck. This opening 21 is of a size sufficient to allow an ordinary gasoline pump nozzle to be inserted therein.

The body 19 is provided with a conventional tapered valve member 22 mounted in a tapered valve seat 23. The valve member 22 is provided with a vertical stem 24 which extends upwardly through the web 20. A packing 25 and packing flange 26, are disposed around the stem 24 and threads on the flange 26 secure the packing and flange in the upper port of the body 19. A coil spring 27 urges the valve 22 downwardly into the tapered valve seat 23 of the body 19.

A lever 28 is secured to the upper end of the valve stem 24 by means of a nut 49 so that when the lever 28 is rotated, the valve will be rotated also.

The lower end of the body portion 19 is provided with a pair of openings 29 and 30 drilled crosswise to each other. The outer ends of these openings are closed by means of plugs 45. A second pair of openings 31 and 32 are drilled upwardly from the lower face of the body 19 and connect with each of the openings 29 and 30.

The valve 22 is provided with an opening 46 extending from its lower end to one of the walls thereof so that liquid may flow through this opening 46 from either of the openings 29 or 30. A third opening 47 is provided in the body 19 and a tube 33 extends from this opening to a fitting 34 fastened to the top member 13 of the fuel tank. A tube 35 extends from the fitting 34 to the engine compartment of the car.

A pair of tubes 36 and 37 are secured in the openings 31 and 32 respectively. The tube 37 extends substantially to the bottom of the fuel tank, while the tube 36 extends only part way to the bottom of the fuel tank.

This valve mechanism just described is a conventional tapered seat two way valve adapted to this particular installation, and is no part of the applicant's invention except insofar as it co-operates with the operating lever 28 and the opening 21 in the web 20. Numerous types of two way valves are now manufactured which will be equally as satisfactory as the one described the only requirement being that the flow of fuel may be controlled by a manually operated lever.

The space within the filler neck 15 between the cap 17 and the web 20 encloses the valve operating handle 28 which has been previously described. This lever 28 is of a crescent shape and is provided with a vertical web 38 by which the lever may be operated. It will be noted from Figure 4 that the movement of the lever 28 is normally about 90°, or from the position shown by full lines to that shown by the dotted lines 39.

When the lever 28 is in the position shown in the full lines in Figure 4, the tube 36 is connected with the tube 33 through the valve 22 so that fuel may be drawn from the tank only to the level to which the bottom of the tube 36 extends. This tube 36 extends only part way to the bottom of the tank so that a reserve capacity of fuel will be left in the lower part of the fuel tank. If now the operating lever 28 is moved to the position shown by the dotted lines 39, the tube 37 will be connected with the tube 33 so that the remainder of the fuel in the tank may then be drawn through this tube.

When the lever 28 is in this latter position, it will be noted that the opening 21 is obstructed by the lever 28 so that the nozzle of a fuel pump cannot be inserted in this opening 21 to refill the tank. The only method by which fuel may be conveniently pumped to the tank is to first move the lever 28 back to the position shown by full lines in Figure 4, whereby the hose nozzle may then be inserted in the opening 21 and the tank filled.

A guide member 40 is secured to the bottom tank member 11 and supports the lower end of the tube 37. The bottom 11 is provided with a depression 41 at this point and an opening 48 is provided in the bottom of this depression 41 so that dirt and water may drain out of the tank at this point.

A sump 42 is secured to the underside of the bottom 11 by means of the flange 43 and is provided with a drain plug 44. A small chamber is thus formed between the bottom member 11 and the sump 42 so that dirt and water may collect in this chamber and thereby remain more or less isolated from the fuel in the tank proper. The dirt and water may be removed by unscrewing the drain plug 44 in the ordinary manner.

Many advantages arise through the use of my improved device, the most important of which is that with this construction the valve is always returned to the normal position when the main tank is refilled. A further advantage results in that a tank having no baffles, partitions or the like may be used with all of the advantages gained by a separate auxiliary tank. Further, the capacity of this auxiliary tank is independent of the angle on which the car may be sitting. This latter feature is obtained only if the lower ends of the tubes 36 and 37 are placed adjacent to the center of the tank bottom plate 11.

Still a further advantage results in that a separate chamber is provided for dirt and water so that these substances once having settled in this chamber will not be permitted to mix with the fuel in the tank due to the surging of the fuel while the car is in operation.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In a fuel tank, a filler neck, a transverse web formed in said filler neck, a valve housing cast integral with said filler neck and extending downwardly from said web adjacent to one wall of said filler neck, an opening in said web adjacent to the opposite wall of said filler neck, a valve mounted in said valve housing having a valve stem extending upwardly through said web, a lever secured to said valve stem within said filler neck, and means for drawing fuel from the bottom of said tank and on through said valve only when said lever partially obstructs said opening.

2. In a fuel tank, a filler neck having a transverse web formed therein, a valve housing extending downwardly from said web adjacent to one side of said filler neck, an opening in said web adjacent to the opposite side of said filler neck, a tube extending from said housing to substantially the bottom of said fuel tank, a second tube extending from said housing to a position spaced from the bottom of said fuel tank, a third tube extending from said valve to the outside of said tank, and an operating lever for said valve disposed above said web and within said filler neck, the parts being so arranged that when fuel is being drawn through the first mentioned tube, the said lever will partially obstruct said opening and when fuel is being drawn through the second mentioned tube the said lever will not obstruct said opening.

EUGENE J. FARKAS.